United States Patent [19]

Park et al.

[11] 4,101,467

[45] Jul. 18, 1978

[54] SOFT ETHYLENIC POLYMER FOAMS

[75] Inventors: Chung Poo Park, Pickerington, Ohio; Warren H. Griffin; John M. Corbett, both of Midland, Mich.

[73] Assignee: The Dow Chemical Company, Midland, Mich.

[21] Appl. No.: 763,374

[22] Filed: Jan. 27, 1977

Related U.S. Application Data

[63] Continuation-in-part of Ser. No. 661,911, Feb. 27, 1976, abandoned.

[51] Int. Cl.² .............................................. C08J 9/14
[52] U.S. Cl. ........................... 521/79; 264/DIG. 5; 521/98; 521/149
[58] Field of Search ........... 260/2.5 HA, 2.5 E, 2.5 B; 264/DIG. 5, 53

[56] References Cited

U.S. PATENT DOCUMENTS

| | | | |
|---|---|---|---|
| 3,449,268 | 6/1969 | Scheffler | 260/2.5 B |
| 3,766,099 | 10/1973 | Kawai et al. | 260/2.5 HA |

*Primary Examiner*—Morton Foelak
*Attorney, Agent, or Firm*—Lester J. Dankert; Tai-Sam Choo

[57] ABSTRACT

Low density, closed cell, soft foam products having dimensional stability are made from ethylenic resins having low stiffness, especially comprising copolymers consisting essentially of ethylene and monoethylenically unsaturated non-ionic comonomers, by release to lower pressure of a flowable, foamable gel under pressure, e.g., by extrusion foaming, wherein the gel comprises the ethylenic polymer and a volatile mixed blowing agent. The stating polymers are preferably copolymers of ethylene and vinyl acetate having stiffness less than about 20,000 psi. The mixed blowing agents are particularly characterized as mixtures of at least one fluorocarbon constituent I and at least one fluorocarbon constituent II, as defined. Exemplary mixtures contain (I) 1,2-dichloro-1,1,2,2-tetrafluoroethane and (II) from 25 to 50 percent chloropentafluoroethane, octafluoropropane or octafluorocyclobutane based on the mixtures of I and II.

21 Claims, No Drawings

SOFT ETHYLENIC POLYMER FOAMS

CROSS REFERENCE

This application is a continuation-in-part of the co-pending application Ser. No. 661,911, filed Feb. 27, 1976, now abandoned.

BACKGROUND OF THE INVENTION

This invention relates to soft ethylenic polymer resin foams made from polymers, especially copolymers, of ethylene having relatively low modulus, i.e., materials lacking stiffness and which are limp, flexible and easily stretched. It particularly pertains to improvement in process whereby are obtained such soft foams having substantially closed cell structure and good dimensional stability.

The term "stiffness" as used herein means the property of plastics as determined by the test procedure described in ASTM D-747, expressed in pounds per square inch (psi).

It is well known to make closed cell ethylenic polymer resin foams by the process of extrusion foaming wherein a normally solid thermoplastic ethylenic polymer resin such as polyethylene is heat-plastified and mixed under pressure with a volatile material such as 1,2-dichlorotetrafluoroethane to form a flowable gel which is then passed through a shaping orifice or die opening into a zone of lower pressure. Upon the release of pressure, the volatile constituent of the gel vaporizes, forming a gas phase cellular structure in the gel which cools to a corresponding cellular foamed solid resin. Desirably, the resulting gas cells are substantially uniform in size, uniformly distributed through the foam body, and closed, i.e., separated from each other by membrane walls of resin. It is generally understood that the properties of the volatile material in context of the polymer resin and process technology affect the cell structure and properties of the foamed resin product. The volatile material should be sufficiently compatible with the resin under conditions of forming the flowable gel so that such gel is substantially homogeneous, but the solubility should be limited so that, when the pressure is released, the volatile material separates from the gel and forms gas bubbles or cells in the resin matrix. Further, the vapor pressure of the volatile material in the gel at the gel extrusion temperature should be high enough to exert pressure in the cell and on the cell walls causing the heat plastified resin to flow and the cellular foam to expand, but should not be so high as to cause the plastic cell walls to rupture which would allow the gas to escape without forming a cellular structure or would cause the bubbles to break and the foam to collapse. Although these and other general principles are thought to be understood, much of the extrusion foaming technology is empirical, based on experience, and directed to very specific materials and details to produce saleable products of narrowly defined specification.

One of the common requirements of acceptable foam resin products is dimensional stability, i.e., it is desired that the linear dimensions and thus the volume of a piece of foam resin not change appreciably, either to shrink or to expand, under ordinary conditions, from the time its manufacture is complete until the time its ultimate useful life is ended. It is also desired that if any appreciable shrinking of a foam is to occur, which is usually the case with a freshly extruded foam, the foam be able to recover within a reasonable period of time to a substantially constant volume close to that of the foam measured shortly after its extrusion. The difficulties of attaining dimensional stability are particularly acute in foams of relatively low density (high expansion ratio) when the resin membrane cell walls are relatively thin. It has been explained that the vapors of volatile material originally present in the cell gradually permeate the cell wall and escape from the foam over a period of time, thereby tending to reduce the inner cell pressure and tending to cause the foam to shrink during that time. However, when the foam is exposed to ambient atmosphere, air and its constituent gases also tend to permeate into the foam through the cell wall over a period of time thereby tending to increase the inner cell pressure. The difficulties of attaining dimensional stability are further accentuated in relatively thick foams. It has been observed that with such foams the time to reach substantially constant, commercially acceptable volume is relatively long, i.e., more time is required for rates of diffusion of residual blowing agent out of the foams and air into such foams to balance. Accordingly, the actual change in cell gas pressure and size is the result of complex and often opposite forces, and the resultant effect on resin foam dimensions is difficult to predict.

Although many volatile hydrocarbons, chlorohydrocarbons, fluorocarbons, and chlorofluorocarbons, as well as volatile ethers, ketones and other materials have been suggested for making extrusion foamed resin products, most are unsatisfactory in one or more respects when used individually. It has been suggested to use mixtures of two or more of such agents, or mixtures thereof with materials not useable alone, in attempt to compensate the inferior properties of each component with the superior properties of one or more other components, thereby to design a better foaming agent. In U.S. Pat. No. 3,766,099, for example, polyethylene is foamed by extrusion of a flowable gel containing a mixture of (A) dichlorodifluoromethane and (B) at least one of monochloropentafluoroethane and octafluorocyclobutane in certain proportions of (B) to (A) and optionally (C) one or more of certain aliphatic hydrocarbons and chlorofluorohydrocarbons. Under certain conditions, the gel is said to produce relatively stable foam products from polyethylene, whereas dichlorodifluoromethane alone produced foams showing considerable shrinkage on storage in air after production. However, the idea of using mixtures of volatile materials as blowing agents introduces even more complexity into the consideration of foaming behavior and makes prediction of results even more difficult.

These difficulties are even greater where, in place of polyethylene, there is used an ethylenic polymer resin having less stiffness, i.e., lower flexural modulus, than polyethylene, e.g., copolymers of ethylene and vinyl acetate (EVA) having stiffness (ASTM D-747) less than 20,000 psi. When such soft copolymers are used, the resulting foam is very sensitive to imbalances of rates of diffusion of the residual blowing agent out of the resin and out of the cells and air into such cells so that the tendency for dimensional instability, e.g., shrinking, is even greater than for stiffer resins and foams. For example, although U.S. Pat. No. 3,766,099 says that its process and mixed blowing agents can be used for foaming EVA resins in place of polyethylene, the fact is that, when the system preferred for use with polyethylene is used with a soft, low stiffness EVA resin, the resulting foam is dimensionally unstable and shrinks excessively on exposure to air, and there is no direction or instruction in the patent to correct the situation and to provide a satisfactory product.

Nevertheless, there is need and desire for foamed resin products which are softer and more flexible than conventional polyethylene foam products, especially for use in constructing items of wearing apparel, particularly for cushioning in sports equipment and athletic padding and for flotation in vests for water skiers, boating safety jackets and the like.

Accordingly, an object of this invention is to provide improved soft, flexible foamed resin products. Another object is to provide method and means for making such foam products. A particular object is to provide such improved method and means for making soft, flexible, substantially closed cell, low density foamed resin products from ethylenic polymer resins which have low stiffness, especially such foamed products having thickness greater than about 0.5 inch. Other objects and advantages of the invention are brought out in the description that follows.

SUMMARY OF THE INVENTION

The objects of this invention are attained in soft, flexible foamed resin products having thickness greater than about 0.5 inch and in improved method and means for making the same from starting ethylenic polymer resins which have low stiffness, i.e., below about 20,000 psi, usually from about 1,000 to about 10,000 psi, using gel foaming technology, particularly characterized by using as blowing agent specific mixtures of gaseous and volatile liquid materials. In general terms, the mixtures are selected to have gel-forming compatibility with the particular resin and vapor pressure at the gel extrusion conditions to form cellular resin structures on extrusion of the gel from higher to lower ambient pressure in accordance with the usual art.

Additionally, and in accordance with this invention, the mixed blowing agent is composed of a primary constituent I which is at least one fluorocarbon from a first group (Group I) and a secondary constituent II which is at least one fluorocarbon from a second group (Group II). The term fluorocarbon is used herein to mean halocarbons containing carbon and fluorine atoms, any other atoms being limited to hydrogen or chlorine atoms. The symbol "FC" hereinafter stands for "fluorocarbon" and numbers are chosen for convenience in referring to these fluorocarbon compounds.

The Group I fluorocarbons are required to have two or four carbon atoms in their molecular structure, normal boiling points, i.e. under standard one atmosphere pressure, between $-25°$ C and $20°$ C, and a value for the critical quantity $T_b - 0.5\,V_c$ of not less than 125 where $T_b$ is the normal boiling point temperature of the fluorocarbon in degrees Kelvin and $V_c$ is its critical mole volume* in cubic centimeters per gram-mole. Specific examples of such Group I fluorocarbons are 1,1-difluoroethane (FC-152A), 1,1,2-trifluoroethane (FC-143), 1-chloro-1,1-difluoroethane (FC-142B), 1-chloro-2,2,2-trifluoroethane (FC-133), 1,1,2,2-tetrafluoroethane (FC-134), 1,2-dichloro-1,1,2,2-tetrafluoroethane (FC-114), 1-chloro-1,1,2,2-tetrafluoroethane (FC-124), 2,2-difluoropropane (FC-272), 1,1,1-trifluoropropane (FC-263), 3,3,3-trifluoropropene (TFP), 1,1,1-trifluorobutane (FC-383), 2,2,3,3-tetrafluorobutane (FC-374), and 1,1,1,3,3,3-hexafluoro-2-methylpropane (FC-356). Each of these fluorocarbons has a normal boiling point temperature between $-25°$ C and $20°$ C and a value for $T_b - 0.5V_c$ greater than 125.

* The critical volume of a substance can be experimentally measured, and the values of many are reported in the literature. It can also be computed as the reciprocal of the critical density, converted to gram-mole basis. Approximate values of critical volume can also be calculated from the molecular structure according to the Lydersen equation as described in "Chemical Process Principles" by Olaf A. Hougen, K. M. Watson and R. A. Ragatz, 2nd Edition, published (1954) by John Wiley & Sons, New York, page 88 and Table 6, page 91. The Lydersen equation is $V_c = 40 + \Sigma\Delta\nu$ where $V_c$ is the critical volume in cubic centimeters per gram-mole and $\Sigma\Delta\nu$ is the summation of the contributions for each atom or atomic group that is present, using values set out in Table 6 on page 91 of the publication.

The Group II fluorocarbons are required to have normal boiling points between $-40°$ and $5°$ C and a value for the critical quantity $T_b - 0.5V_c$ as above defined of not greater than 110. Specific examples of such Group II fluorocarbon compounds ae chloropentafluoroethane (FC-115), 1-chloroheptafluoropropane (FC-217), perfluoropropane (FC-218), perfluorocyclopropane (FC-216), perfluoro-n-butane (PFNB), perfluoroisobutane (PFIB), and perfluorocyclobutane (FC-318). All of these fluorocarbons have normal boiling point temperatures between $-40°$ and $5°$ C and values for $T_b - 0.5V_c$ less than 110. Most of the Group II fluorocarbons are perhalo compounds and many are perfluorocarbon compounds.

The blowing agent mixtures for use in accordance with this invention generally contain from about 10 to about 50, preferably from about 15 to about 45, parts of material from Group II in a total of 100 parts, all by weight, of the mixture with material from Group I.

The starting ethylenic polymer resins are preferably composed of copolymers of ethylene and from about 5 to about 45 weight percent of vinyl acetate. The resulting copolymer foams have densities from about 1.5 to about 20 pounds per cubic foot (pcf) and are preferably low density foams having densities from about 1.5 to about 6 pcf.

DETAILED DESCRIPTION AND EMBODIMENTS

The soft ethylenic polymers for use in making soft foams according to this invention are normally solid polymers of ethylene having low stiffness up to about 20,000 psi, preferably from about 1,000 to about 10,000 psi, as determined by ASTM D-747. Such polymers have lower stiffness than do homopolymers of ethylene, the stiffness of which normally runs from about 20,000 to about 60,000 psi or more, depending primarily on density and crystallinity. The present low stiffness polymers are copolymers which consist essentially of ethylene and at least one monoethylenically unsaturated non-ionic comonomer, especially another olefin or a carboxylic ester such as a vinyl ester of a saturated carboxylic acid or an alkyl ester of a monoethylenically unsaturated carboxylic acid. The term "non-ionic" is meant to exclude comonomers which have free acid groups or their salts.

Typical soft ethylenic polymers for use in accordance with this invention are low stiffness copolymers of ethylene with one or more non-ionic comonomers copolymerizable therewith such as propylene, butene-1 and other olefins especially α-olefins, vinyl esters such as vinyl acetate, vinyl propionate and like vinyl esters of monocarboxylic acids, and esters of monoethylenic carboxylic acids such as methyl acrylate, ethyl acrylate, propyl acrylate and methacrylate, the several butyl and isobutyl acrylates and methacrylates, 2-ethylhexyl acrylate, dimethyl maleate, and like monoethylenic carboxylic acid esters, and mixtures of such non-ionic comonomers copolymerizable with ethylene. Typical soft such copolymers have a major proportion of ethylene copolymerized therein with a minor proportion of one or more copolymerizable comonomers selected to provide the desired low stiffness. For example, suitable ethylene copolymers comprise from about 5, preferably from about 10, to about 45 weight percent vinyl acetate. In addition to the non-ionic comonomer or comonomers in the copolymer with ethylene, the copolymer may optionally contain a small amount of one or more of ionic comonomers, preferably not more than an amount corresponding to one-half of the amount of non-ionic comonomer in the copolymer and not more than about 5 weight percent of the copolymer. By "ionic" is meant comonomers which contain free carboxylic acid groups or other acid groups or the salts thereof such as acrylic acid, methacrylic acid and their sodium, lithium and like salts.

Blends of suitable low-stiffness copolymers can be used as the starting resin. Moreover, the starting resin blends can also contain small proportions of polymers which in themselves are too stiff to be used as such, provided that such blends also contain sufficient low-stiffness copolymers so that the resulting blends have the required stiffness.

As indicated hereinbefore, the blowing agents for use in accordance with this invention are certain mixtures including ones containing 1,2-dichlorotetrafluoroethane (FC-114). By itself, FC-114 is described in U.S. Pat. No. 3,067,147 as particularly suitable for making low density extruded foam from polyethylene. According to that patent, copolymers of ethylene, including those with vinyl acetate, can similarly be foamed with FC-114. However, as will be shown hereinafter, foams made from low stiffness copolymers of ethylene and vinyl acetate using FC-114 alone as blowing agent are not entirely satisfactory in regard to dimensional stability. In general, fluorocarbons of the kind characterized in Group I as hereinbefore defined, when used individually or as mixtures thereof as blowing agents for low stiffness ethylenic resins, are not entirely satisfactory in regard to dimensional stability of the resulting foams.

Now, in accordance with this invention, it has been discovered that dimensionally stable, low-density soft foams are obtained from ethylenic polymers having low stiffness by using as blowing agent mixtures composed of materials selected from Groups I and II of materials as hereinbefore defined, as essential constituents of the blowing agent, and comprising, per 100 parts by weight total blowing agent, from about 50 to about 90, preferably from about 55 to about 85, parts of material from Group I and from about 10 to about 50, preferably from about 15 to about 45, parts of material from Group II; optionally, up to about 25 parts of the Group I material can be replaced by other volatile blowing agents of conventional kinds so that there is at least about 75 total parts of material from Groups I and II.

The blowing agent mixture is compounded into the starting low-stiffness polymer resin in proportions to make the desired degree of expansion in the resulting foamed cellular product, usually up to about 40-fold volume expansion to make products having foam densities down to about 0.024 g/cc (about 1.5 pounds per cubic foot). Depending on the starting proportion of blowing agent, the resulting foam products of this invention have densities from about 1.5 to about 20 pounds per cubic foot (pcf), those having densities from about 1.5 to about 6 pcf being called "low density" foams herein. The maximum useful proportion of such blowing agent in composition of flowable, foamable gel is in the order of about 0.12 to 0.18 gmols per 100 grams of the starting resin, being greater, for example, as the proportion of the material from Group I is greater in the mixed blowing agent. The maximum useful proportion of blowing agent in the flowable, foamable gel is also affected by the pressure which is maintained on the gel in the extrusion die passage, being greater when the die pressure is relatively higher under conditions such as when the die orifice is relatively smaller and/or the through-put rate is relatively greater.

The mixed blowing agent is compounded into the starting resin in conventional fashion to make a flowable gel, preferably in continuous manner, e.g., in a mixing extruder, using heat to plastify the resin, pressure to maintain the blowing agent in non-gaseous state, and mechanical working to obtain a thorough mixing of the resin and blowing agent. The resulting gel is then cooled if necessary and passed through a suitable die orifice into a zone of lower pressure, e.g., normal ambient air atmosphere, where it expands to a lower density, cellular mass. As the foamed extrusion forms, it is taken away from the extruder, allowed to cool to harden the resin, and collected for further processing, storage or other disposal.

The resulting ethylenic polymer foam is comprised of substantially closed cell structure and is very soft in compression, limp and flexible to bending and shaping, and is pleasing to the touch. Surprisingly, it is found that the foamed product is remarkably stable in dimensions on exposure to ambient atmospheric air, even at low foam density.

For the present purposes, dimensional stability of the foam refers to changes which occur in foam volume, particularly in later stages of manufacture and during subsequent storage of the foam product.

As the foamable gel emerges from the extruder die orifice in the foam extrusion process, foaming begins, and the gel foam volume increases with expansion of the gas constituent forming many closed cells in the resin matrix. The evaporation of blowing agent from liquid gel phase to gas phase and exposure of the gel to ambient atmosphere causes cooling of the foam so that the expanding gel/resin foam quickly reaches a maximum volume and then begins to shrink. This first shrinkage stage is primarily caused by the effect of falling temperature on the foam cell volume but is complicated by the relatively greater diffusion of gases out of rather than into the cell space. The thermal shrinkage of the foam would stop when the foam resin hardens and the foam temperature reaches ambient atmosphere temperature, if no other factors were present. Usually, the foam continues to shrink at ambient temperature during the period when the net rate of diffusion of gases out of the foam cells is greater than the rate of diffusion of air into such cells. As indicated, in soft foams of low stiffness copolymers, this loss of gas from the foam cells is manifested by decreased volume of the cells and shrinkage of the foam, whereas in a foam of more rigid material the gas loss would result in lower cell gas pressure with little or no shrinkage of the foam volume overall.

In soft foams, any shrinkage as described continues until the cell gas composition changes sufficiently to balance the gas diffusion out of and into the cells. Having reached a minimum, the foam volume then usually begins to expand again as air continues to diffuse into the cell space from which residual gas from the blowing agent is diffusing at ever lower rate. This re-expansion of the soft foam from minimum volume continues until the cells are again inflated and the foam attains substantially constant volume.

For the present purposes, the dimensional stability of the extrusion foam products is measured by observing the changes in volume occurring in test specimens of the foam as a function of time. The test specimens are obtained by quickly cutting, from the extrusion foam product soon, e.g., within about fifteen minutes, after emerging from the extrusion die orifice, pieces of varying thickness approximately 5.5 inches wide by 7.5 inches long and accurately measuring their overall volume, e.g., by cubic displacement of water. The initial volume of each specimen is arbitrarily selected as the bench mark volume for the subsequent dimensional stability study. The individual foam specimen is exposed to air at atmospheric pressure and ordinary room temperature; its volume is re-measured from time to time and related on volume percentage basis to the initial volume. From the resulting data observations are made particularly as to (1) the minimum volume to which the specimen is reduced by shrinking as percent of initial volume;
(2) the time required to reach such minimum volume of (1);
(3) the steady state maximum volume to which the specimen subsequently re-expands or recovers, as percent of initial volume; and
(4) the time required to reach such steady state recovered volume of (3).

In general, the preferred products have little shrinkage in (1) and recover their initial volume (3) in a short time (4). In practical terms, substantially complete recovery (3) and attainment of constant volume in relatively short time (4) are probably more important than the degree of shrinking in (1), although systems that show little early shrinkage often also show prompt and complete recovery to constant volume.

In the instant invention, a soft extruded foam is considered to be dimensionally stable for practical purposes if the minimum volume to which a body of the foam having an initial thickness of 1.5 inches shrinks is not less than about 65, preferably not less than about 70, percent of the volume of that body taken shortly, e.g., within about 15 minutes, after extrusion from the die orifice, and if the volume of the foam body five weeks, preferably 2 weeks, after its extrusion is not less than 85 percent of the volume of that body taken within about 15 minutes after extrusion from the die orifice and is substantially constant thereafter under ambient atmospheric conditions. The term "dimensionally stable" in reference to the subject soft ethylenic polymer foams is used herein in the sense of the foregoing definitive description.

The specific working examples that follow are intended to illustrate the invention but are not to be taken as limiting its scope. In the examples, parts and percentages are by weight unless otherwise specified or required by the context.

EXAMPLE 1

Ethylenic polymer foams were made by continuous extrusion from a conventional screw-type extruder having 3.5 inch diameter. The extruder comprises the usual sequential zones usually denominated feed zone, compression and melt zone, metering zone, and mixing zone. The barrel is provided with conventional electric heaters for zoned temperature control and with usual instrumentation. An inlet opening for fluid blowing agent under pressure and feed rate control is provided in the extruder barrel between the metering zone and the mixing zone. The discharge end of the mixing zone of the extruder is connected, through a cooler providing a cooling and temperature control zone, to a die orifice having generally rectangular configuration 2.25 inches wide with gap of approximately 0.15 inch.

In practice, polymeric resins in the form of common granules are fed through the feed hopper to the extruder at rate of approximately 200 pounds per hour. The temperature in the metering zone is maintained in the range $180° \pm 20°$ C. Blowing agent is pumped into the inlet between the metering and mixing zones at predetermined rate under pressure to maintain liquid phase. The mixed mass of molten polymer and blowing agent from the mixing zone is cooled in the temperature control zone to a substantially uniform temperature which is just above the temperature at which solid polymer would crystallize out of the gel, which in the case of the ethylenic copolymer used in this example is in the range from about 85° to about 88° C, before passing through the die orifice. The mass emerging from the die orifice to atmospheric pressure expands and forms a cellular foam which is continuously conducted away from the die as the foam forms, cools and hardens to to a strip of foamed, cellular, flexible solid resin approximately 1.5 inches thick and 5.5 to 6 inches wide.

In the tests described below in this example, there was used a solid resinous copolymer of ethylene and 18% vinyl acetate, having standard Melt Index 2.5 dg/min and stiffness of 4,500 psi, in the form of molding granules. These were mixed in the feed hopper of the extruder with powdered magnesium silicate as foam nucleation and cell size control agent fed to the hopper at substantialy constant rate as shown in Table I. The blowing agent comprised FC-114 mixed with various proportions of FC-115 as indicated hereinafter, fed to the extruder at substantially constant rate as shown in Table I.

From the resulting extruded foam products there were cut specimens at about 5 minutes after extrusion. These specimens were cut about 7.5 inches long in the direction of the extrusion and the edges were trimmed to about 5.5 inches wide, having various thicknesses as shown in Table I. The overall volumes of these specimen were promptly and accurately measured by cubic displacement of water. Their apparent or bulk density was also measured and computed as pounds per cubic foot as recorded in Table I. The volumes of the specimen were remeasured from time to time as hereinbefore described; these volumes, as percentage of the initial 5-minute volume, are recorded in Table I. All of the foam products of Tests Nos. 1.0 through 1.16 were soft-textured, closed cell foams having substantially uniform cells of about from 0.7 to 1.3 mm diameter.

TABLE I

| Test No. | FC-115 (1) | BA Rate (2) | NA Rate (3) | Density pcf (4) | Thickness in. (5) | V% | Minimum Time (6) | Volume % after time in weeks | | | | |
|---|---|---|---|---|---|---|---|---|---|---|---|---|
| | | | | | | | | 1 | 2 | 3 | 4 | 5 |
| 1.0 | none | 41.5 | 1.5 | 2.8 | 1.46 | 54 | 3 | 56 | 58 | 59 | 67 | 72 |
| 1.1 | 15 | 51 | 0.24 | 2.2 | 1.47 | 75 | 2 | 80 | 85 | 86 | 88 | 88 |
| 1.2 | " | " | " | " | 0.97 | 77 | 1 | 85 | 87 | 92 | 91 | 90 |
| 1.3 | " | " | " | " | 0.73 | 73 | 1 | 84 | 85 | 89 | 90 | 90 |
| 1.4 | " | " | " | " | 0.49 | 75 | 1 | 90 | 92 | 96 | 96 | 96 |
| 1.5 | 20 | 50 | 0.24 | 2.2 | 1.52 | 80 | 2 | 87 | 90 | 91 | 95 | 95 |
| 1.6 | " | " | " | " | 1.04 | 79 | 1 | 92 | 92 | 91 | 96 | 97 |
| 1.7 | " | " | " | " | 0.82 | 80 | 1 | 97 | 98 | 94 | 98 | 100 |
| 1.8 | " | " | " | " | 0.51 | 84 | 1 | 102 | 99 | 96 | 102 | 102 |
| 1.9 | 25 | 53 | 0.24 | 2.1 | 1.58 | 85 | 1 | 93 | 95 | 95 | 98 | 99 |
| 1.10 | " | " | " | " | 1.03 | 86 | 1 | 101 | 97 | 96 | 100 | 104 |
| 1.11 | " | " | " | " | 0.74 | 92 | 1 | 104 | 100 | 100 | 104 | 104 |
| 1.12 | " | " | " | " | 0.55 | 98 | 0.5 | 114 | 110 | 110 | 116 | 112 |
| 1.13 | 30 | 56 | 0.10 | 2.1 | 1.50 | 88 | 1 | 92 | 96 | 98 | — | 97 |
| 1.14 | 35 | 47 | 0.20 | 2.3 | 1.53 | 87 | 1 | 94 | 98 | 97 | 97 | 98 |
| 1.15 | 40 | 42 | 0.04 | 2.4 | 1.59 | 91 | 1 | 96 | 98 | 100 | 100 | 100 |

Notes:
(1) Weight percent of FC-115 in mixture with FC-114.
(2) Rate of feed of mixed blowing agent in pounds per hour.
(3) Rate of feed of nucleation agent in pounds per hour.
(4) Density of foam body in pounds per cubic foot, measured within about 5 minutes after extrusion.
(5) Thickness of foam body in inches.
(6) Approximate time in days to reach minimum volume expressed as percentage of initial volume.

From the results and data shown in Table I it will be seen, from Test No. 1.0, that about 1.5 inch thick low density soft foam made from the low stiffness ethylene/vinyl acetate copolymer with FC-114 alone as the blowing agent does not have very good dimensional stability. It shrank to almost half (54%) of its initial (5 minutes post-extrusion) volume during about three days. Thereafter it began to re-expand and was still changing (increasing in volume) five weeks after extrusion and its volume then was less than its initial volume.

As shown in Test Nos. 1.1–1.12, the dimensional stability of the foam products depends not only on the amount of FC-115 in the blowing agent mixtures but also on their thickness. The dimensional stability improves with the decreasing thickness of the foam products and the increasing concentration of FC–115 in the blowing agent mixtures.

The low density soft foam products of Test Nos. 1.13, 1.14 and 1.15, made using blowing agent mixtures of FC–114 with from 30 to 40 weight percent added FC–115 are seen to be very much more stable in volume dimensions than the foam product of Test No. 1.0 and better than that of Test Nos. 1.1, 1.5, and 1.9, which have a thickness of about 1.5 inch. These foams shrank comparatively little and within a period of less than about 2 weeks had recovered substantially to their initial volume and reached a substantially constant steady state volume.

Soft foam products capable of satisfying the criteria for the "dimensional stability" set out hereinbefore can be made under the conditions of Test Nos. 1.1–1.15.

The dimensional stability of foam products improves with the increasing density thereof. The density of foam products listed in Table I is in the range of 2.1 to 2.8 pounds per cubic foot. If foam products having a density of about 6 pounds per cubic foot were to be made, then such products would have a better dimensional stability than the corresponding foam products shown in Table I.

EXAMPLE 2

In Test Nos. 2.1 through 2.5, the extrusion foaming process of Example 1 was carried out using as starting polymers various low stiffness solid copolymers of ethylene and vinyl acetate and mixtures thereof as shown in Table II.

TABLE II

| Test No. | Starting Polymers Weight percent of copolymer | | |
|---|---|---|---|
| | A(1) | B(2) | C(3) |
| 2.1 | 100 | 0 | 0 |
| 2.2 | 0 | 100 | 0 |
| 2.3 | 80 | 0 | 20 |
| 2.4 | 0 | 70 | 30 |
| 2.5 | 0 | 50 | 50 |

Notes:
(1)Copolymer of ethylene and 28% vinyl acetate having stiffness 1700 psi and Melt Index 6 dg/min.
(2)Copolymer of ethylene and 28% vinyl acetate having stiffness 1700 psi and Melt Index 3 dg/min.
(3)Copolymer of ethylene and 18% vinyl acetate having stiffness 4500 psi and Melt Index 2.5 dg/min.

The starting polymer of Test Nos. 2.1 through 2.5 were fed through the feed hopper to the extruder in the form of ordinary granules at rate of approximately 200 pounds per hour and, in the case of Test Nos. 2.1 and 2.3, were mixed in said hopper with powdered magnesium silicate as foam nucleation and cell size control agent, fed to the hopper at substantially constant rate as shown in Table III. The blowing agents for these tests were mixtures of FC–114 with from 30 to 35 weight percent added FC–115, fed to the extruder at substantially constant rate as shown in Table III. The tests of this example were carried out in the same apparatus and using operating conditions as described in Example 1. The resulting foams were soft, substantially closed cell foams having densities from about 1.9 to 2.4 pounds per cubic foot, as shown in Table III, and substantially uniform cells of from 0.5 to 1.5 mm diameter. Specimens were cut from the resulting foams at about 5 minutes after extrusion. Specimens were cut about 7.5 inches long in the direction of the extrusion and the edges were trimmed to about 5.5 inches wide, being the full thickess of about from 1.3 to 1.6 inches of the extruded foam strip. The overall volumes of these specimens were measured in the manner described in Example 1 with results shown in Table III.

TABLE III

| | | | | | | | Volume % after time in weeks | | | | |
|---|---|---|---|---|---|---|---|---|---|---|---|
| Test No. | FC-115 (1) | Rate (2) | Rate (3) | Density pcf (4) | Thickness in. (5) | V% | Minimum Time (6) | 1 | 2 | 3 | 4 | 5 |
| 2.1 | 35 | 47 | .20 | 2.5 | 1.50 | 90 | 1 | 101 | 102 | — | 100 | — |
| 2.2 | 30 | 53 | 0 | 1.9 | 1.45 | 80 | 1 | 90 | 96 | 96 | 96 | 95 |
| 2.3 | 35 | 51 | 0.006 | 2.3 | 1.34 | 96 | 1 | 96 | 101 | 100 | 100 | 97 |
| 2.4 | 30 | 52 | 0 | 2.2 | 1.38 | 86 | 3 | 95 | 99 | 98 | 99 | 99 |
| 2.5 | 30 | 55 | 0 | 2.2 | 1.60 | 85 | 3 | 88 | 97 | 96 | 95 | 95 |

Foam volume changes in percent based on 5-minute initial volume

Notes: As in Table I

In place of part or all of the FC-115 in the blowing agent mixtures in the foregoing Examples 1 and 2, particularly as to Tests 1.1-1.16 and 2.1-2.5, there is used perfluorocyclobutane (FC-318) and/or perfluoropropane (FC-218) with comparable results in that the resulting foam products are soft, closed celled, low density foams, having substantially uniform small cells, which are dimensionally stable within the practical limits of volume change as hereinbefore described. In like manner, in place of all or part of the FC-114 in the blowing agent mixtures giving soft, closed cell, low density foams which are dimensionally stable, there is used one or more materials selected from Group I as hereinbefore defined with substantially similar results.

For example, the following combinations of primary constituent (I) and secondary constituent (II) materials as blowing agent provide low density, dimensionally stable foams:

Mixture of (I) 1,2-dichloro-1,1,2,2-tetrafluoroethane and (II) octafluorocyclobutane;

Mixture of (I) 1,1,1-trifluoropropane and (II) octafluorocyclobutane;

Mixture of (I) 1,1-difluoroethane and (II) octafluorocyclobutane;

Mixture of (I) 1,1,2,2-tetrafluoroethane and (II) octafluorocyclobutane;

Mixture of (I) 1,2-dichloro-1,1,2,2-tetrafluoroethane and (II) octafluoropropane;

Mixture of (I) 1,1,1-trifluoropropane and (II) octafluoropropane;

Mixture of (I) 1,1-difluoroethane and (II) octafluoropropane; and

Mixture of (I) 1,1,2,2-tetrafluoroethane and (II) octafluoropropane.

In place of the particular ethylene copolymers used in the preceding examples there can be used other low stiffness ethylenic copolymers as hereinbefore described with substantially similar results in obtaining soft, low density, closed cell foams having good dimensional stability.

What is claimed is:

1. A method for making soft ethylenic polymer resin foams having substantially closed cell structure, dimensional stability, and thickness greater than about 0.5 inch from starting ethylenic polymer resins which have low stiffness less than about 20,000 psi and which comprise low stiffness copolymers of ethylene which copolymers consist essentially of ethylene and monoethylenically unsaturated non-ionic comonomers, by forming under heat and pressure a flowable gel composition of the starting polymer resin and a volatile blowing agent and releasing the resulting flowable gel to ambient air atmosphere whereby the blowing agent separates from the gel and forms gas bubbles in the polymer resin, particularly characterized in that the volatile blowing agent is composed of a mixture of an essential constituent I which is at least one fluorocarbon which has normal boiling point between −25° and 20° C, from 2 to 4 carbon atoms in its molecular structure, and a value for the critical quantity $T_b - 0.5V_c$ of not less than 125 where $T_b$ is the normal boiling point temperature of the fluorocarbon in degrees Kelvin and $V_c$ is its critical volume in cubic centimeters per gram-mole, and an essential constituent II which is at least one fluorocarbon which has normal boiling point between −40° and 5° C and a value for its critical quantity $T_b - 0.5V_c$ as above defined of not greater than 110, the mixed blowing agent containing, per 100 parts by weight, from about 10 to about 50 parts of fluorocarbon constituent II and at least about 75 parts of total fluorocarbon constituents I and II, and there being up to about 0.18 gram-mole of such mixed blowing agent per 100 grams of polymer resin in the flowable gel.

2. The method of claim 1 wherein the mixed blowing agent containing, per 100 parts by weight, from about 15 to about 50 parts of fluorocarbon constituent II.

3. The method of claim 1 wherein the fluorocarbon constituent I of the blowing agent mixture is 1,2,-dichloro-1,1,2,2-tetrafluoroethane.

4. The method of claim 1 wherein the fluorocarbon constituent I of the blowing agent mixture is 1,1,1-trifluoropropane.

5. The method of claim 1 wherein the fluorocarbon constituent I of the blowing agent mixture is 1,1-difluoroethane.

6. The method of claim 1 wherein the fluorocarbon constituent I of the blowing agent mixture is 1,1,2,2-tetrafluoroethane.

7. The method of claim 1 wherein the fluorocarbon constituent II of the blowing agent mixture is chloropentafluoroethane.

8. The method of claim 1 wherein the fluorocarbon constituent II of the blowing agent mixture is octafluorocyclobutane.

9. The method of claim 1 wherein the fluorocarbon constituent II of the blowing agent mixture is octafluoropropane.

10. The method according to claim 1 wherein the starting ethylenic polymer resin comprises a copolymer which consists essentially of ethylene and from about 5 to about 45 weight percent vinyl acetate based on the copolymer.

11. The method of claim 10 wherein the blowing agent is a mixture of 1,2-dichloro-1,1,2,2-tetrafluoroethane and chloropentafluoroethane.

12. The method of claim 10 wherein the blowing agent is a mixture of 1,2-dichloro-1,1,2,2-tetrafluoroethane and octafluorocyclobutane.

13. The method of claim 10 wherein the blowing agent is a mixture of 1,1,1-trifluoropropane and octafluorocyclobutane.

14. The method of claim 10 wherein the blowing agent is a mixture of 1,1-difluoroethane and octafluorocyclobutane.

15. The method of claim 10 wherein the blowing agent is a mixture of 1,1,2,2-tetrafluoroethane and octafluorocyclobutane.

16. The method of claim 10 wherein the blowing agent is a mixture of 1,2-dichloro-1,1,2,2-tetrafluoroethane and octafluoropropane.

17. The method of claim 10 wherein the blowing agent is a mixture of 1,1,1-trifluoropropane and octafluoropropane.

18. The method of claim 10 wherein the blowing agent is a mixture of 1,1-difluoroethane and octafluoropropane.

19. The method of claim 10 wherein the blowing agent is a mixture of 1,1,2,2-tetrafluoroethane and octafluoropropane.

20. As an article of manufacture, a soft ethylenic polymer resin foam having substantially closed cell structure, dimensional stability, and thickness greater than about 0.5 inch wherein the ethylenic polymer resin comprises a copolymer of ethylene which copolymer consists essentially of ethylene and monoethylenically unsaturated non-ionic comonomer and has stiffness less than about 20,000 psi, the foam having density from about 1.5 to about 20 pounds per cubic foot and particularly characterized in that the gas space of the foam cells originally consisting essentially of a constituent I which is at least one fluorocarbon which has normal boiling point between −25° and 20° C, from 2 to 4 carbon atoms in its molecular structure and a value for the critical quantity $T_b - 0.5V_c$ not less than 125 where $T_b$ is the normal boiling point temperature in degrees Kelvin of the fluorocarbon and $V_c$ is its critical volume in cubic centimeters per gram-mole, and a constituent II which is at least one fluorocarbon which has normal boiling point between −40° and 5° C and a value for its critical quantity $T_b - 0.5V_c$ as above defined not greater than 110.

21. An article of manufacture according to claim 20 wherein the ethylenic polymer foam has density from about 1.5 to about 6 pounds per cubic foot, and the ethylenic polymer resin is a copolymer which consists essentially of ethylene and from about 10 to about 45 weight percent vinyl acetate, which copolymer has stiffness less than about 10,000 psi.

* * * * *